(12) United States Patent
Ricordi et al.

(10) Patent No.: US 6,722,550 B1
(45) Date of Patent: Apr. 20, 2004

(54) FUEL LEVEL INDICATOR FOR COMBUSTION TOOLS

(75) Inventors: Christian Paul A. Ricordi, Bourg-les-Valence (FR); Joseph E. Fabin, Elmwood Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/434,510

(22) Filed: May 9, 2003

(51) Int. Cl.[7] .................................................. B25C 1/08
(52) U.S. Cl. ............................ 227/10; 227/130; 227/2; 123/465 C; 173/20
(58) Field of Search .......................... 227/10, 130, 9, 227/8, 2; 123/456 C, 46 H, 46 R, 196 R; 173/20

(56) References Cited

U.S. PATENT DOCUMENTS

| 4,403,722 A |   | 9/1983  | Nikolich |            |
|-------------|---|---------|----------|------------|
| 4,483,474 A |   | 11/1984 | Nikolich |            |
| 4,522,162 A |   | 6/1985  | Nikolich |            |
| 5,000,128 A | * | 3/1991  | Veldman  | 123/46 SC  |
| 5,115,944 A |   | 5/1992  | Nikolich |            |
| 5,415,136 A | * | 5/1995  | Doherty et al. | 123/46 SC |
| 5,911,350 A | * | 6/1999  | Bolger et al. | 227/2 |
| 6,102,270 A | * | 8/2000  | Robinson | 227/10 |
| 6,123,241 A |   | 9/2000  | Walter et al. |  |
| 6,145,724 A | * | 11/2000 | Shkolnikov et al. | 227/8 |
| 6,179,192 B1 | * | 1/2001 | Weinger et al. | 227/8 |
| 6,247,626 B1 | * | 6/2001 | MacVicar | 227/10 |

* cited by examiner

Primary Examiner—Scott A. Smith
(74) Attorney, Agent, or Firm—Lisa M. Soltis; Mark W. Croll; Donald J. Breh

(57) ABSTRACT

A combustion tool employing a replaceable pressurized fuel cell includes a fuel condition monitor system for monitoring and indicating fuel cell fuel condition. The fuel condition monitor system includes a fuel condition monitor for monitoring at least one of fuel cell pressure and fuel flow from the fuel cell, a control unit connected to the monitor for receiving fuel condition data sensed by the monitor, comparing the sensed data with preset values and determining fuel level in the fuel cell based on the determinations, a metering valve connected to the control unit, providing the exact amount of fuel based upon fuel cell condition, and an indicator connected to the control unit for providing an indication of fuel level. A method of monitoring and indicating combustion tool fuel cell condition includes providing a preset series of fuel cell condition values, monitoring fuel cell condition, obtaining fuel cell condition data, comparing the monitored data with preset values and determining whether there is sufficient fuel and providing a signal to an indicator.

20 Claims, 4 Drawing Sheets

FUEL LEVEL INDICATOR FOR COMBUSTION TOOLS

BACKGROUND OF THE INVENTION

The present invention relates to improvements in combustion tools, such as the type used for driving fasteners into work pieces. More specifically, the present invention relates to such combustion tools using replaceable fuel cells, also called fuel canisters. As exemplified in Nikolich U.S. Pat. Nos. 4,403,722, 4,483,474, 4,522,162, and 5,115,944, all of which are incorporated by reference, it is known to use a disposable fuel cell for dispensing a pressurized hydrocarbon fuel to a combustion gas-powered tool, such as, for example, a combustion gas-powered fastener-driving tool. Such fastener-driving tools and such fuel cells are available commercially in the United States from ITW-Paslode (a division of Illinois Tool Works, Inc.) of Vernon Hills, Ill., under its IMPULSE trademark, and in Europe from ITW SPIT (another division of Illinois Tool Works Inc.) of Bourg-les-Valence, France. In particular a suitable fuel cell is described in Nikolich U.S. Pat. No. 5,115,944, listed above.

One disadvantage of conventional combustion tools using such pressurized fuel cells fuel canisters is that, as the tool is operated, the fuel in the cell is progressively depleted. As this occurs, the internal fuel cell pressure drops until the cell is empty, or at least empty enough that there is insufficient fuel for further fastener-driving combustion events. Presently, if the tool fails to fire, the users typically remove the fuel cell from the tool to determine whether the empty fuel cell is the cause. An expensive drawback of this practice is that often the tool misfired for a reason unrelated to the fuel cell, and otherwise usable fuel cells are often disposed of.

Another factor in the use of combustion tool fuel cells is that variations in ambient temperature will influence the internal pressure of the fuel cell. As the temperature drops, more fuel is needed for combustion. Conversely, at higher temperatures, less fuel is required, and the fuel cell may have a longer operational life. However, conventional tools are configured so that the fuel-metering valve emits fuel to the tool combustion chamber independent of both the amount of fuel in the fuel cell, as well as operational environmental conditions.

Accordingly, there is a need for an improved combustion tool that provides an indication of the amount of fuel in the fuel cell. In addition, there is a need for an improved combustion tool in which the amount of fuel transmitted to the tool fuel metering valve is variable as a function of the amount of fuel remaining in he cell, and environmental conditions such as temperature.

BRIEF SUMMARY OF THE INVENTION

The above-listed needs are met or exceeded by the present fuel condition monitoring system for a combustion tool. The system determines the level of fuel in the fuel cell by monitoring at least one of fuel pressure and fuel flow between the fuel cell and the tool. Sensed fuel condition data is compared with preset values to determine the amount of fuel remaining in the fuel cell. Upon reaching the determination of fuel level, an indicator is provided for alerting the user as to the amount of fuel remaining in the fuel cell. If desired, a control unit used for making the determination can also control the operation of the fuel-metering valve based on the determination of fuel cell level. An optional temperature sensor is provided for monitoring fuel cell temperature and providing temperature information to the control unit for adjusting the operation of the metering valve in accordance with the temperature information.

More specifically, a combustion tool employing a replaceable pressurized fuel cell includes a fuel condition monitor system for monitoring the condition of fuel in the fuel cell and for indicating the monitored condition to a user. The fuel condition monitor system includes a fuel condition monitor for monitoring at least one of fuel cell pressure and fuel flow from the fuel cell, a control unit connected to the monitor for receiving fuel condition data sensed by the monitor, comparing the sensed data with preset values and determining fuel level in the fuel cell based on the determinations, and an indicator connected to the control unit for providing a user with an indication of the fuel level in the fuel cell.

In another embodiment, a method of monitoring and indicating fuel cell condition of a fuel cell in a combustion tool includes providing a preset series of fuel cell condition values, monitoring fuel cell condition and obtaining current fuel cell condition data, comparing the monitored fuel cell condition data with the preset values, determining the amount of fuel in the fuel cell and providing a signal to an indicator for indicating the amount of fuel in the fuel cell.

DETAILED DESCRIPTION OF THE INVENTION

Figure 1:
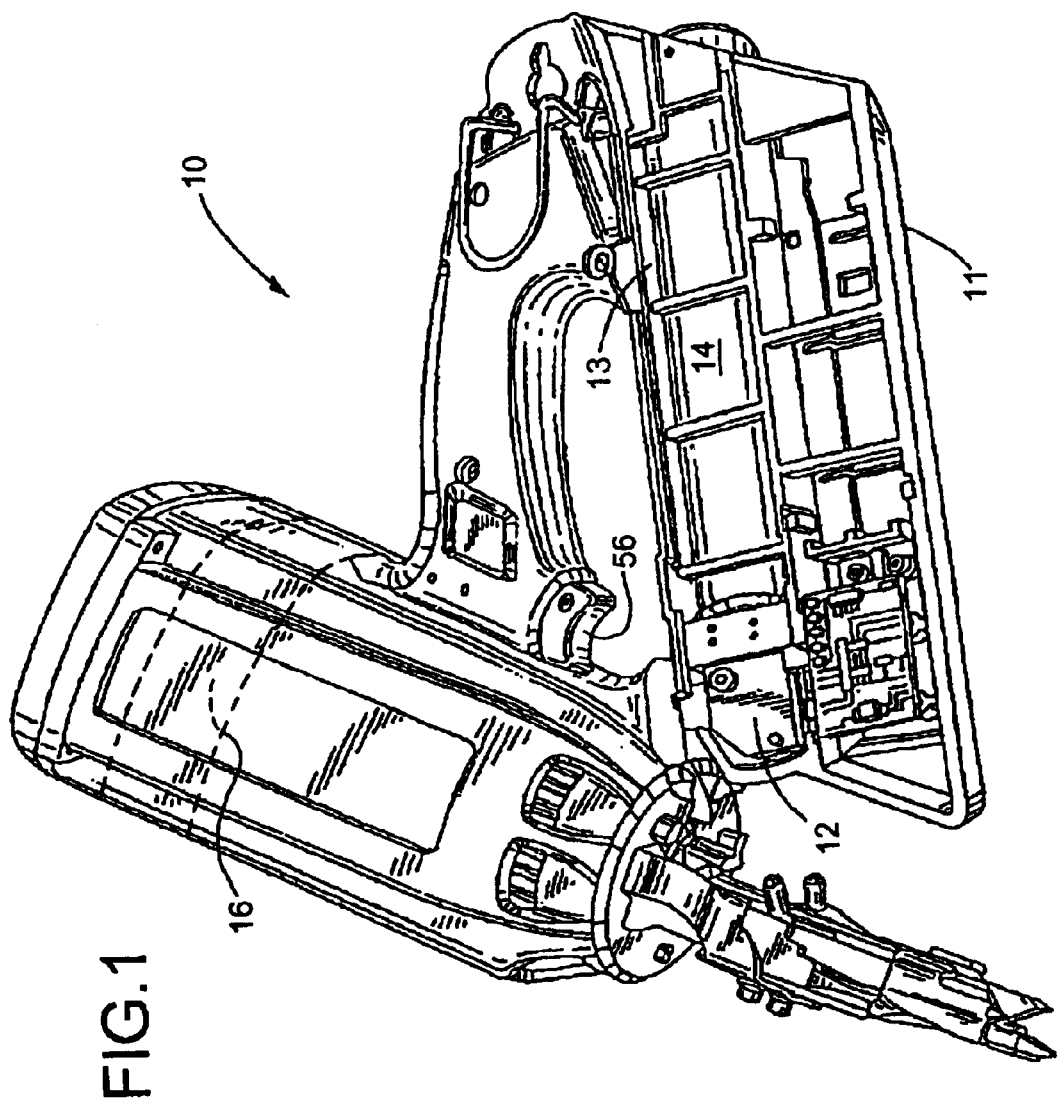
FIG. 1 is a perspective view of a combustion tool suitable for use with the present fuel cell condition monitoring system.

Referring now to FIG. 1, a combustion-powered tool of the type suitable for use with the present invention is generally designated 10. The tool 10 includes a housing 11 enclosing a fuel metering valve 12, and a fuel cell chamber 13 which releasably houses a fuel cell 14. As is known in the art, fuel from the fuel cell 14 is transmitted by the valve 12 to a combustion chamber 16 (shown hidden). The construction and operation of the tool 10 is described in detail in the patents incorporated by reference and referred to above. While a trim-type tool is depicted, it is contemplated that the present invention may be used with any type of combustion tool employing a fuel cell such as the fuel cell 14, which is preferably replaceable and disposable.

Figure 2:
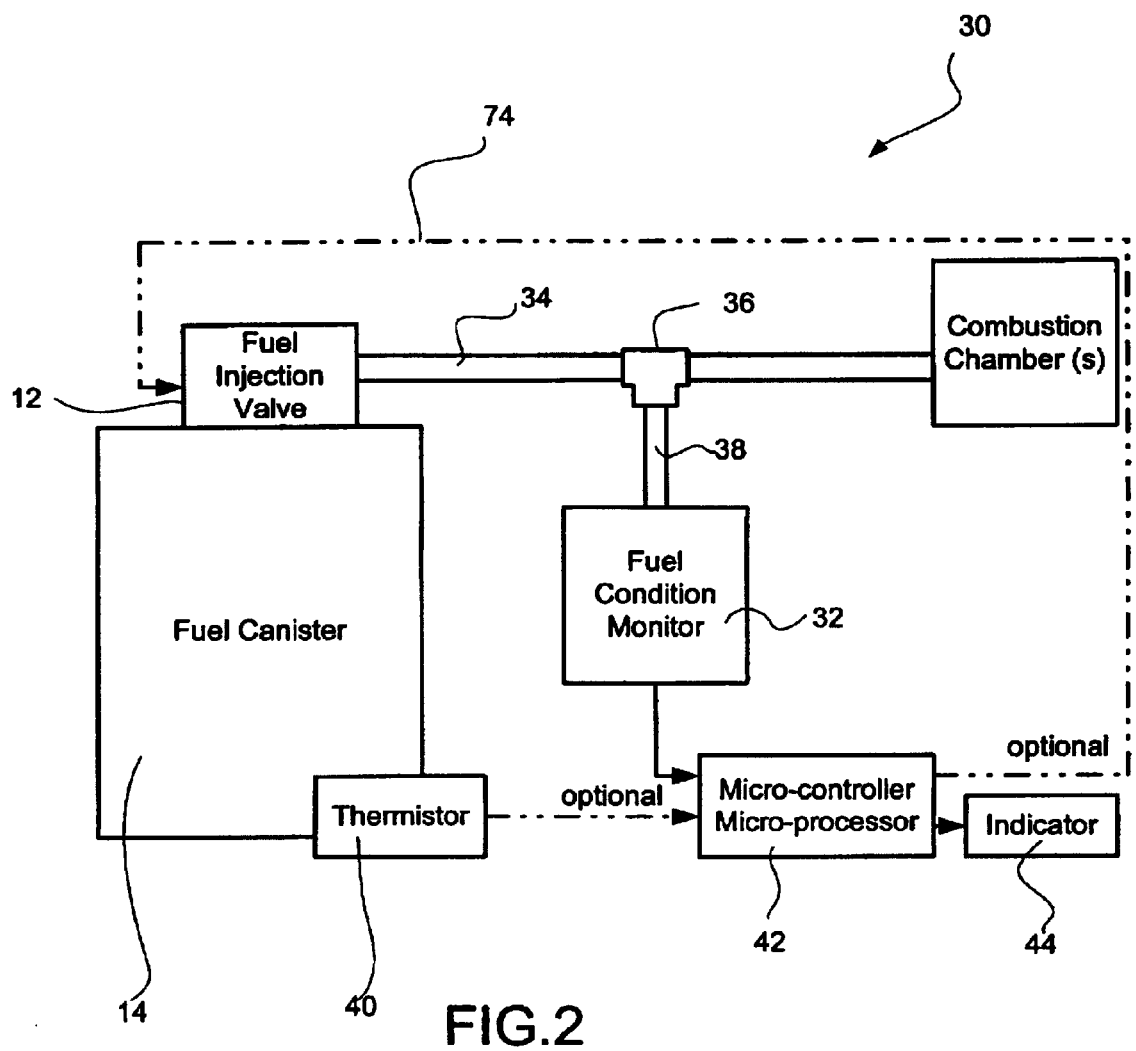
FIG. 2 is a schematic of the relative disposition and connection of the components of the present fuel condition monitoring system.

Referring now to FIG. 2, a fuel condition monitoring system suitable for use with the tool 10 is generally designated 30 and is configured for monitoring the condition of fuel in the fuel cell 14 and for indicating the monitored condition to a user. In the present application, the condition of the fuel will generally relate to the amount or level of fuel remaining in the fuel cell 14. This amount or level is typically determined by monitoring the pressure of the fuel emitted from the cell, or the flow of the fuel as it is emitted from the fuel cell 14 to the combustion chamber 16. As described above, as the fuel level decreases, the pressure and/or the fuel flow drops.

A main feature of the present fuel monitoring system 30 is a fuel condition monitor 32. As described above, the fuel condition monitor 32 may either be configured to monitor either fuel pressure monitor or fuel flow. However, it is contemplated that other monitorable parameters of fuel in the fuel cell 14 may be monitored by the present system 30. Specifically, the pressure pulse or flow pulse is measured as the fuel-metering valve 12 emits a pulse of fuel for use in a combustion event in the combustion chamber 16.

As is known in the art, one such event is needed each time a fastener is driven by the tool 10. Accordingly, the fuel condition monitor 32 is located downstream of the fuel-metering valve 12, and is connected, or in fuel communication with, the fuel line 34 passing between the valve 12 and the combustion chamber 16 as is known in the art. In the preferred embodiment, the fuel condition monitor 32 is connected to the fuel line 34 using a "T"-fitting 36 having a short segment of line 38 connecting the T-fitting to the monitor, however other types of connections are contemplated, including inline and oblique angle fittings. It is contemplated that the monitor 32 may monitor either fuel pressure or fuel flow. The types of monitoring will be discussed separately, with pressure monitoring first. When fuel pressure is monitored, the basic concept is that fuel pressure is an indicator of the amount of fuel remaining in the fuel cell 14. As fuel level decreases during tool use, the pressure will accordingly decrease.

In the preferred embodiment, the pressure sensor serving as the monitor 32 is a commercially available model which transmits an analog signal to a control unit described below. While such sensors are available from various manufacturers, one suitable model is Model MPX 4250A Integrated Silicon Pressure Sensor made by Motorola, Schaumburg, Ill. Upon sensing pressure, the monitor 32 will send a representative voltage signal. The higher the pressure, the larger the voltage.

When the valve 12 opens, the fuel condition monitor 32 senses a pressure pulse. This pressure pulse is dependent on the flow resistance of the path between the fuel-metering valve 12 and the combustion chamber 16, and is also dependent upon the fuel pressure in the valve. The pressure in the valve 12 is generated by the fuel cell 14 and as such is directly indicative of the fuel pressure in the fuel cell 14.

The fuel cell pressure depends on the fullness of the fuel cell 14 and also on cell temperature. By design, manufacturers of the fuel cells 14 are aware of the pressure of a fuel cell which is virtually empty and only has fuel for a limited number of remaining combustion events. In such condition, the tool may fire only 10–25 additional times depending on tool consumption and temperature. However, depending on the size/volume of the fuel cell, 14, the associated tool specifications, and the temperature, this value may change. For example, the designers of one tool 10 suitable for use with the present system 30 have associated a voltage of 0.6 volts with a threshold of a virtually empty fuel cell. Thus, to indicate to the user that the fuel cell 14 is shortly going to need replacement, the system 30 will be set to indicate that condition to the user at a threshold of 0.6 volts. The monitored pressure pulse is compared to this preset value, or in some cases a table is programmed with known values for various levels of fuel cell or fuel canister fullness at a given temperature, to determine the actual fullness of the fuel canister. To further the above example, 5 volts may indicate a full cell or canister, 2.5 volts a half full cell, 1.0 volt an almost empty cell and 0.6 volts a virtually empty cell.

The fullness table can also contain pressure variations with temperature. For basic reading such as "full", "partly full" or "empty", the pressure reading from the monitor 32 is typically sufficient, since the temperature is already included in the pressure. If more accurate readings are needed, an optional temperature sensing device 40 may be provided in operational proximity to the fuel cell 14 for measuring fuel cell temperature.

Assuming, as described above, that the fuel condition monitor 32 is a pressure sensor, then typically the sensor is configured for outputting the voltage proportional to the amount of pressure being sensed. This voltage, as well as any signals transmitted by the temperature sensing device 40, are sent to a control unit, preferably a microprocessor/microcontroller 42. Preferably the microcontroller 42 is already located in the tool 10 performing other control and/or sequencing tasks, however it is also contemplated that a designated microcontroller may be provided for the present system 30. Whether the microcontroller functions will be incorporated by the previously existing controller or by a separate unit will vary depending on the application.

The microcontroller 42 is provided with the preset levels (5.0 volts, 2.5 volts, 1.0 volt and 0.6 volts in the example above) and converts the analog signal to a digital value (it is to be understood that these voltage presets are provided for example only, and will vary to suit the application). These values are assigned numerical designations, for example 5.0 volts=255, 2.5 volts=128, 1.0 volt=50 and 0.6 volts=30. Since the main goal of the system 30 is to provide the user of the tool 10 with an indication of whether the fuel cell 14 needs replacement, the fundamental threshold of "virtual empty" may be all that is needed by the user. It is contemplated that a set of thresholds would be developed through a trial and error process for each type of tool 10 and each fuel cell 14.

Assuming for the purposes of the example that the fuel cell 14 is "virtually empty", and the monitor 32 provides a signal of 0.5 volts. Since that is below the threshold, the microcontroller 42 will sense that the number will be below 30 and generate a signal to an indicator 44 configured for displaying the amount of fuel remaining in the cell. In the preferred embodiment, the indicator 44 displays a range of indication corresponding to the level of fuel in the fuel cell 14. While the indicator 44 in the preferred embodiment is typically visual, it is also contemplated that the indicator is configured for providing at least one of a visual and an audible indication of the fuel cell condition to a user, and such indicators, including but not limited to Light Emitting Diodes (LED's) are well known to skilled designers of such tools.

Figure 3:
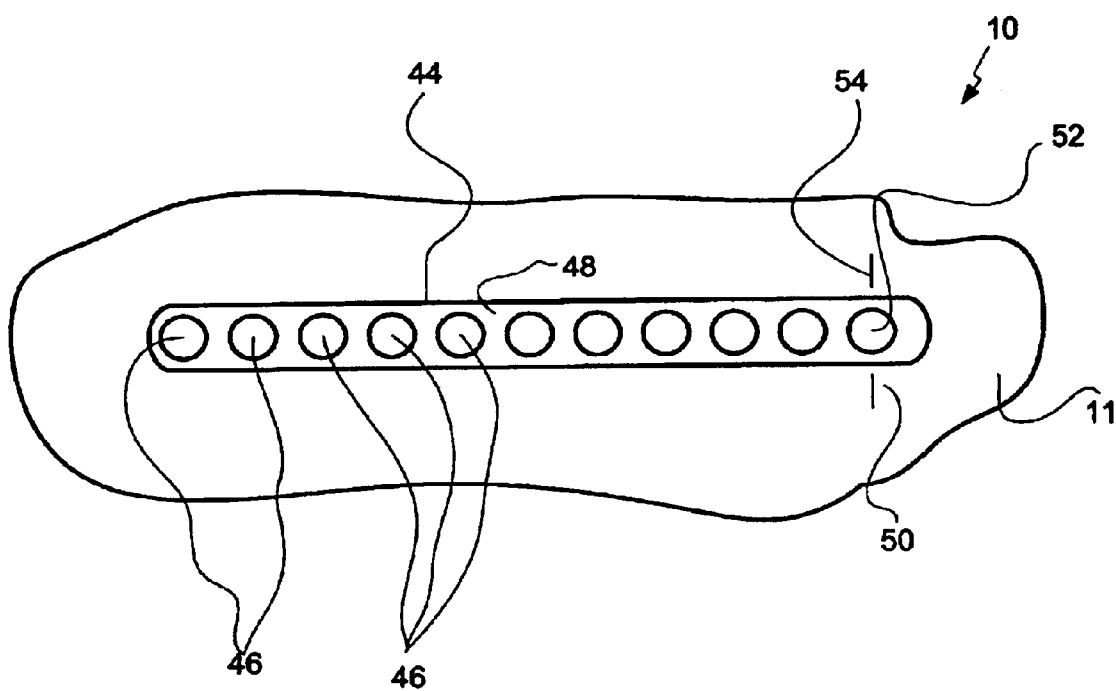
FIG. 3 is a schematic view of the present indicator.

Referring now to FIG. 3, the indicator 44 is configured for indicating at least one of the amount of fuel remaining in fuel cell 14 for example by the number of LED's 46 lit along a scale 48 or whether the cell requires replacement at 50. In the latter situation, a single bicolor (red/green) LED 52 may be employed, which displays green while sufficient fuel is present. Once the "virtually empty" threshold is met, the LED 52 changes to red. As is shown in the drawing, the housing 11 may also be provided with a formation 54 distinguishing the bicolor LED 52. The indicator 44 is preferably visible through the housing 11 of the tool 10. It is contemplated that the indicator 44 may be placed anywhere on the housing that is convenient for the user and easily read.

If the fuel condition monitor 32 is configured for sensing fuel flow, it is typically placed in the fuel line 34 between the fuel-metering valve 12 and the combustion chamber 16, as when the monitor 32 measures pressure. However, it is also contemplated that the monitor measuring flow may be located directly in the line 34, without the use of the line segment 38. As is known in the art, such flow monitors include, but are not limited to pressure switches, mechanical levers making or breaking an optical switch, and opto-electronics such as the use of an LED light source and a phototransistor device. In the present application, fuel flow refers to the presence of sufficient fuel flow in the fuel line 34 to trigger the monitor 32.

The fuel condition monitor 32 which is configured for monitoring fuel flow between the fuel cell 14 and the tool 10, and specifically between the metering valve 12 and the combustion chamber 16, sends a representative voltage signal to the microcontroller 42. Next, the microcontroller 42 compares the sensed signal with preset voltages. As with the pressure-sensing monitor 32, the specific voltage values associated with flow will vary to suit the application by the volume of the fuel cell 14, the specifications of the tool 10 and the outside temperature. A compilation of such preset values is referred to as a table, as described above. If the sensed value falls below the preset value, the microcontroller 42 sends a signal to the indicator display 44. The user then receives a visual (flashing or constant) and/or audible indication of the level of fuel in the fuel cell 14.

Figure 4:
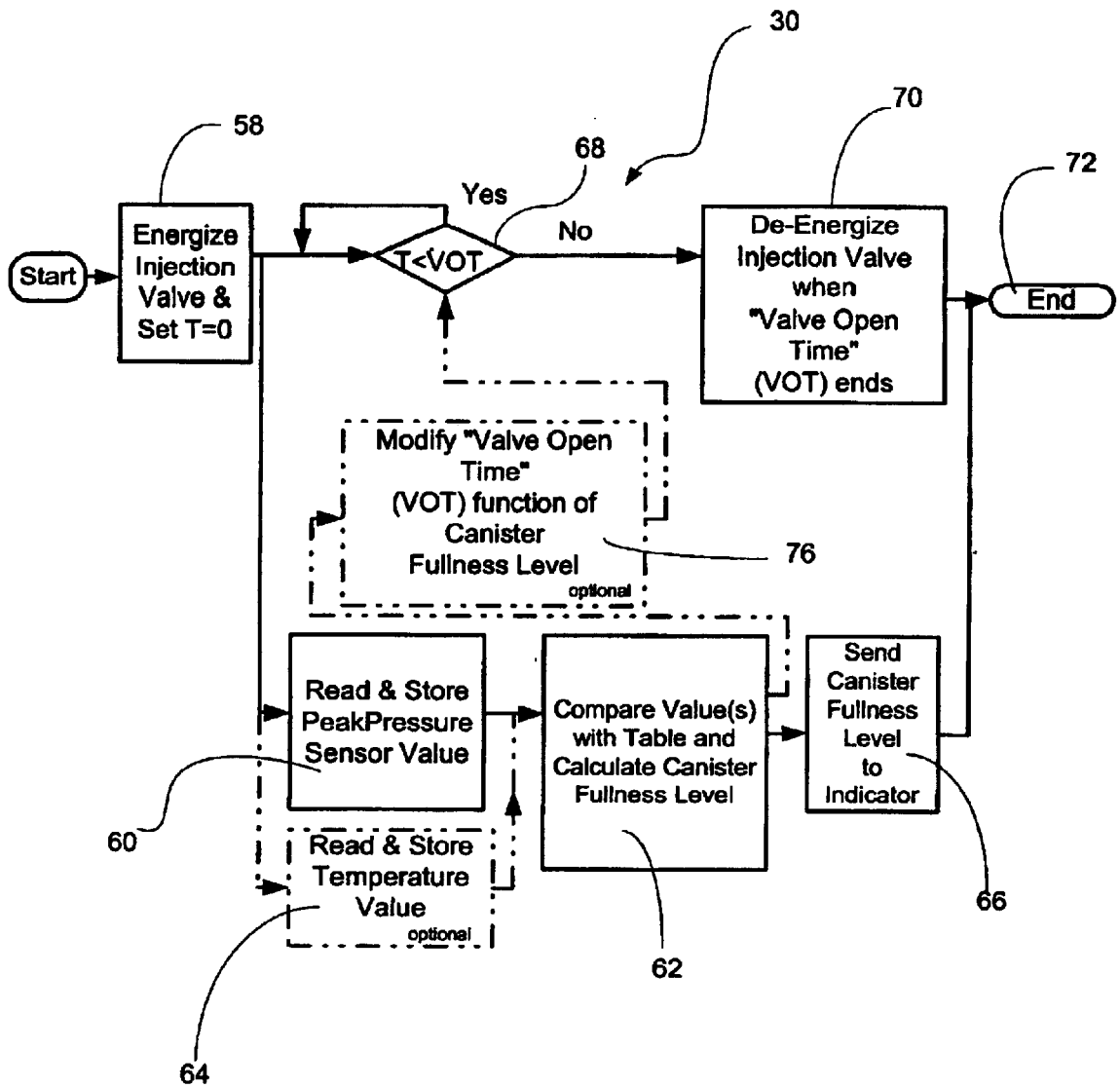
FIG. 4 is a logic schematic of the monitoring system of FIG. 2.

Referring now to FIG. 4, the logic of the present system 30 is provided. As indicated above, the microcontroller 42 is preferably already employed in the tool 10 for coordinating combustion, as is known in the art in the patents made of record above. Upon the user initiating the firing sequence, among other things, the microcontroller 42 signals the fuel-metering valve 12 to eject a pulse of fuel into the fuel line 34, and also starts an internal clock at T=0, shown at 58. In this scenario, the metering valve 12 is open a designated amount of time sufficient for emitting the desired amount of fuel.

As shown at 60, the microcontroller 42 reads and stores the sensor value, either pressure as shown or fuel flow. The sensed value is then compared with the preset values or table at 62 and a fuel cell or canister fullness level is calculated by analyzing whether the sensed value is greater or less than the preset value. In applications where the optional temperature sensing device 40 is provided, the cell temperature is measured and sent to the microcontroller 42 at 64 for the fullness level calculation based on temperature's effect on pressure.

At the same time, the metering valve 12 is energized and maintained open. As shown at diamond 68, the valve 12 stays open as long as T is less than Valve Open Time (VOT). This VOT is the time needed to eject the exact amount of fuel from the fuel cell 14 to the combustion chamber 16. Once T VOT, the valve is closed, at box 70. Upon sending the fullness value to the indicator 44 at step 66 and the valve clock indicating the valve 12 should be closed, the routine ends at 72.

As shown by dashed line 74 in FIG. 2, the microcontroller 42 may also be used to keep the valve 12 open for a longer period or a shorter period, depending on the table programmed into the microcontroller 42. This modification of the valve timing is shown in the dashed box 76 in FIG. 4. The VOT can be changed depending on a fuel cell condition sensed by either a pressure sensor or a flow sensor. The VOT is adjusted to provide the correct amount of fuel when the fuel cell condition changes due to the fuel cell. fullness level. The fuel monitoring control 32 and the microcontroller 42 may be used to operate the fuel metering valve 12 without the use of the temperature sensing device 40, since the fuel cell condition sensed by either the pressure sensor or the flow sensor is already a function of fuel cell temperature. However, when temperature sensing device 40 is present, the VOT adjustment and fuel cell fullness level can be more accurate since temperature is now known.

Thus, it will be seen that the present system 30 provides a way for the user to easily monitor the status of the level of fuel in the fuel cell. In this manner, tool malfunctions may be more easily diagnosed, since time is not wasted on checking the fuel cell fuel level when that is not the cause for malfunction. In addition, users will not be forced to discard usable fuel cells in the mistaken belief that they are empty. In addition, fastener-driving production is made more efficient, in that the user knows precisely when to change the fuel cell.

While particular embodiments of the present fuel cell level monitoring and indicating system has been shown and described, it will be appreciated by those skilled in the art that changes and modifications may be made thereto without departing from the invention in its broader aspects and as set forth in the following claims.

What is claimed is:

1. A combustion tool employing a replaceable pressurized fuel cell, comprising:
a fuel condition monitor system for monitoring the condition of fuel in said fuel cell and for indicating the monitored condition to a user.

2. The tool of claim 1 further including a combustion chamber, and wherein said fuel condition monitor system includes a fuel condition monitor constructed and arranged to monitor said fuel cell condition between said fuel cell and said combustion chamber.

3. The tool of claim 1 wherein said fuel condition monitor system includes a pressure monitor configured for monitoring the pressure of fuel in said fuel cell.

4. The tool of claim 1 wherein said fuel condition monitor system includes a fuel flow monitor configured for monitoring fuel flow between said fuel cell and said tool.

5. The tool of claim 4 wherein said fuel flow monitor is taken from the group consisting of pressure switches, mechanically actuated optical switches and opto-electronics such as LED light sources and phototransistor receivers.

6. The tool of claim 3 further including a fuel cell metering valve and a combustion chamber, and wherein said fuel condition monitor is constructed and arranged to monitor fuel cell condition between said valve and said chamber.

7. The tool of claim 4 further including a fuel cell metering valve and a combustion chamber, and wherein said fuel condition monitor is constructed and arranged to monitor fuel cell condition between said valve and said chamber.

8. The tool of claim 1 further including a fuel condition monitor, a control unit connected to said fuel condition monitor, and an indicator connected to said control unit for providing an indication of said fuel cell condition to a user.

9. The tool of claim 8 wherein said indicator is configured for indicating at that there is sufficient fuel for only a limited number of combustion events.

10. The tool of claim 1 further including a fuel condition monitor and a control unit, wherein said fuel condition monitor and said control unit are connected to a fuel-metering valve of the tool, and said fuel condition monitoring system is configured for controlling the operation of the valve as a function of the monitored fuel condition.

11. The tool of claim 10 further including a temperature sensing device operatively connected to said fuel cell for monitoring fuel cell temperature, said temperature sensing, device connected to said control unit for providing signals to said control unit for influencing the operation of said valve as a function of the fuel condition of said fuel cell.

12. The tool of claim 10 further including an indicator connected to said control unit for displaying the monitored fuel cell condition.

13. The tool of claim 10 wherein said control unit is configured for comparing sensed fuel condition data with preset values and providing a visual indication of deviations from the preset values.

14. A fuel condition monitor system for monitoring the condition of fuel in a fuel cell of a combustion tool, and for indicating the monitored condition to a user, said system including:

a fuel condition monitor for monitoring at least one of fuel cell pressure and fuel flow from said fuel cell;

a control unit connected to said monitor for receiving fuel condition data sensed by said monitor, comparing said sensed data with preset values and determining fuel level in said fuel cell based on said determinations; and an indicator connected to said control unit for providing a user with an indication of said fuel level in said fuel cell.

15. The system of claim 14 wherein the tool includes a fuel metering valve and said control unit is connected to said fuel metering valve, and further including a temperature sensor configured for sensing the temperature of said fuel cell and providing sensed temperature data to said control unit for corresponding adjustment of said valve.

16. A method of monitoring and indicating fuel cell condition of a fuel cell in a combustion tool, comprising:

providing a preset series of fuel cell condition values;

monitoring fuel cell condition and obtaining current fuel cell condition data;

comparing said monitored fuel cell condition data with said preset values;

determining the amount of fuel in said fuel cell; and providing a signal to an indicator for indicating the amount of fuel in the fuel cell.

17. The method of claim 16 wherein said tool includes a fuel metering valve and said method further including:

controlling the operation of the metering valve as a function of said determination of the amount of fuel in said fuel cell.

18. The method of claim 16 further including:

providing a temperature sensor associated with said fuel cell;

monitoring the temperature of said fuel cell;

providing temperature data in said comparison of said monitored fuel cell condition data and said preset values;

determining the amount of fuel in said fuel cell as a function of temperature; and adjusting a fuel-metering valve in said tool in response to said determination.

19. The method of claim 16 wherein said monitoring includes reading pressure values of fluid pressure in said fuel cell.

20. The method of claim 16 wherein said monitoring includes reading fuel flow values of a flow of fluid between a fuel metering valve connected to said fuel cell and a combustion chamber.

* * * * *